US006984970B2

(12) United States Patent
Capel

(10) Patent No.: US 6,984,970 B2
(45) Date of Patent: Jan. 10, 2006

(54) CONDITIONING CIRCUIT FOR A POWER SUPPLY AT THE MAXIMUM POWER POINT, A SOLAR GENERATOR, AND A CONDITIONING METHOD

(75) Inventor: Antoine Capel, Goyrans (FR)

(73) Assignee: Alcatel, Paris (FR)

( * ) Notice: Subject to any disclaimer, the term of this patent is extended or adjusted under 35 U.S.C. 154(b) by 99 days.

(21) Appl. No.: 10/665,017

(22) Filed: Sep. 22, 2003

(65) Prior Publication Data

US 2005/0017697 A1    Jan. 27, 2005

(30) Foreign Application Priority Data

Sep. 19, 2002    (FR)    .................. 02 11 597

(51) Int. Cl.
*G05F 5/00*    (2006.01)
(52) U.S. Cl. .................... 323/299; 323/906; 363/95
(58) Field of Classification Search ................ 323/906, 323/299, 303, 222; 363/95, 98, 97, 55, 56, 363/80
See application file for complete search history.

(56) References Cited

U.S. PATENT DOCUMENTS

| 5,235,266 | A | * | 8/1993 | Schaffrin | ............. 323/205 |
| 5,268,832 | A | * | 12/1993 | Kandatsu | ............. 363/95 |
| 5,923,100 | A | | 7/1999 | Lukens et al. | |
| 6,262,558 | B1 | | 7/2001 | Weinberg | |

FOREIGN PATENT DOCUMENTS

| DE | 100 60 108 A1 | 6/2002 |
| EP | 0 827 254 A2 | 3/1998 |
| EP | 1 239 576 A2 | 9/2002 |
| FR | 2 819 653 A1 | 7/2002 |

OTHER PUBLICATIONS

Gow Ja A et al: "A Modular DC-DC Converter and Maximum Power Tracking Controller Formedium to Large Scale Photovoltaic Generating Plant"8th European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Chihchiang Hua et al: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.

(Continued)

*Primary Examiner*—Rajnikant B. Patel
(74) *Attorney, Agent, or Firm*—Sughrue Mion, PLLC

(57) ABSTRACT

The invention relates to a conditioning circuit that measures operating points of a power supply to deduce therefrom the current-voltage characteristic thereof and to determine directly the voltage corresponding to its maximum power point, without using any kind of tracking algorithm that causes the operating point of the power unit to oscillate about the maximum power point. The maximum power point voltage VMPP is supplied to a controller which regulates a power cell by slaving it to the input voltage until the output voltage of the supply is equal to the maximum power point voltage $V_{MPP}$. The invention also relates to a solar generator and an associated conditioning method. One particular application is to high-power satellites.

11 Claims, 5 Drawing Sheets

OTHER PUBLICATIONS

Matsuo H et al: "Novel Solar Cell Power Supply System Using the Miltiple-input DC-DC Converter" 20th International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.

Chihchiang Hua et al: "DSO-based controller application in battery storage of photovoltaic system" Industrial Electronics, Control, and Instrumentation, 1996, Proceedings of the 1996 IEEE IECON 22nd International Conference on Taipei, Taiwan Aug. 5-10, 1996, New York, NY, USA, IEEE, US, Aug. 5, 1996, pp. 1705-1710, XP010203239.

Enslin J H R et al.: "Integrated Photovoltaic maximum Power Point Tracking Converter"IEEE Transactions on Industrial Electronics, IEEE Inc. New York, US, vol. 44, No. 6, Dec. 1, 1997, pp. 769-773, XP000750720.

Hua C et al: "Implementation of a DSP-Controlled Photovoltaic System with Peak Power Tracking"IEEE Transactions on industrial Electronics, IEEE, Inc. New York, US, vol. 45, No. 1, Feb. 1, 1998, pp. 99-107, XP000735209.

* cited by examiner

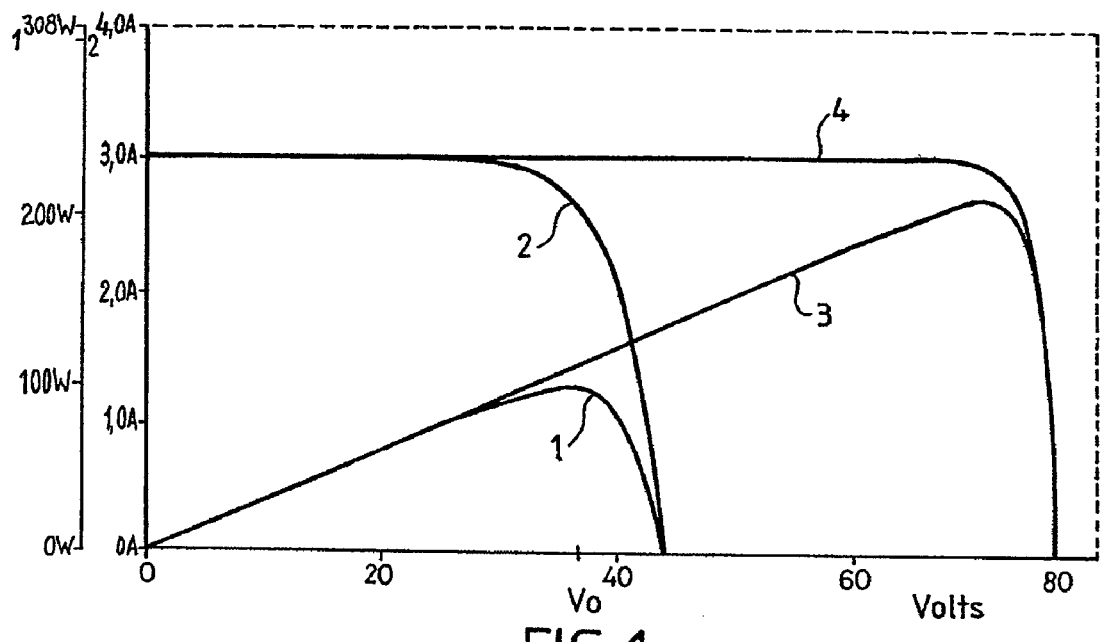
FIG_1
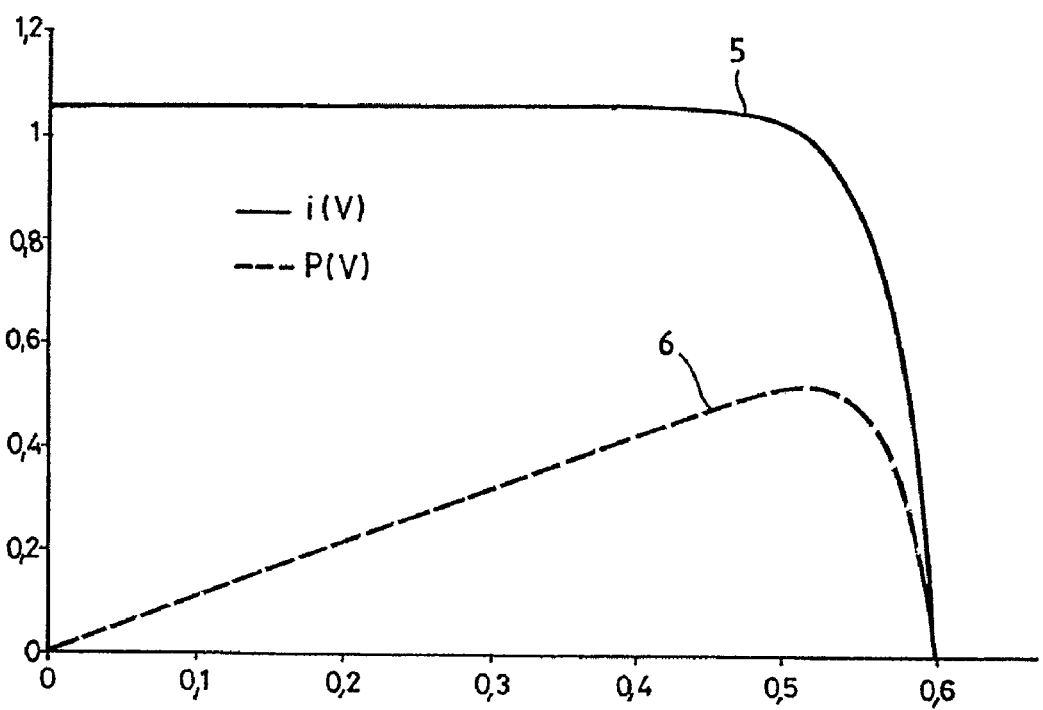
FIG_2

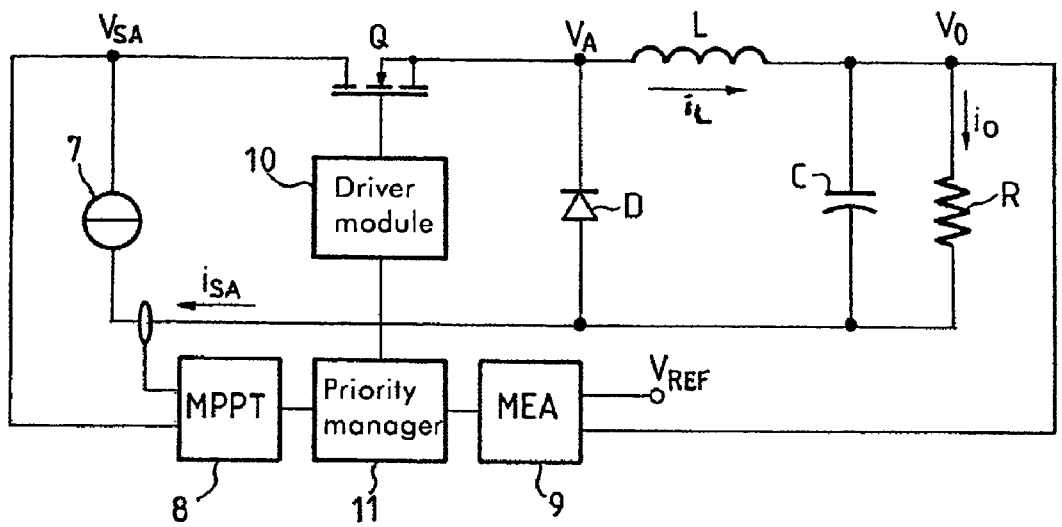
FIG_3
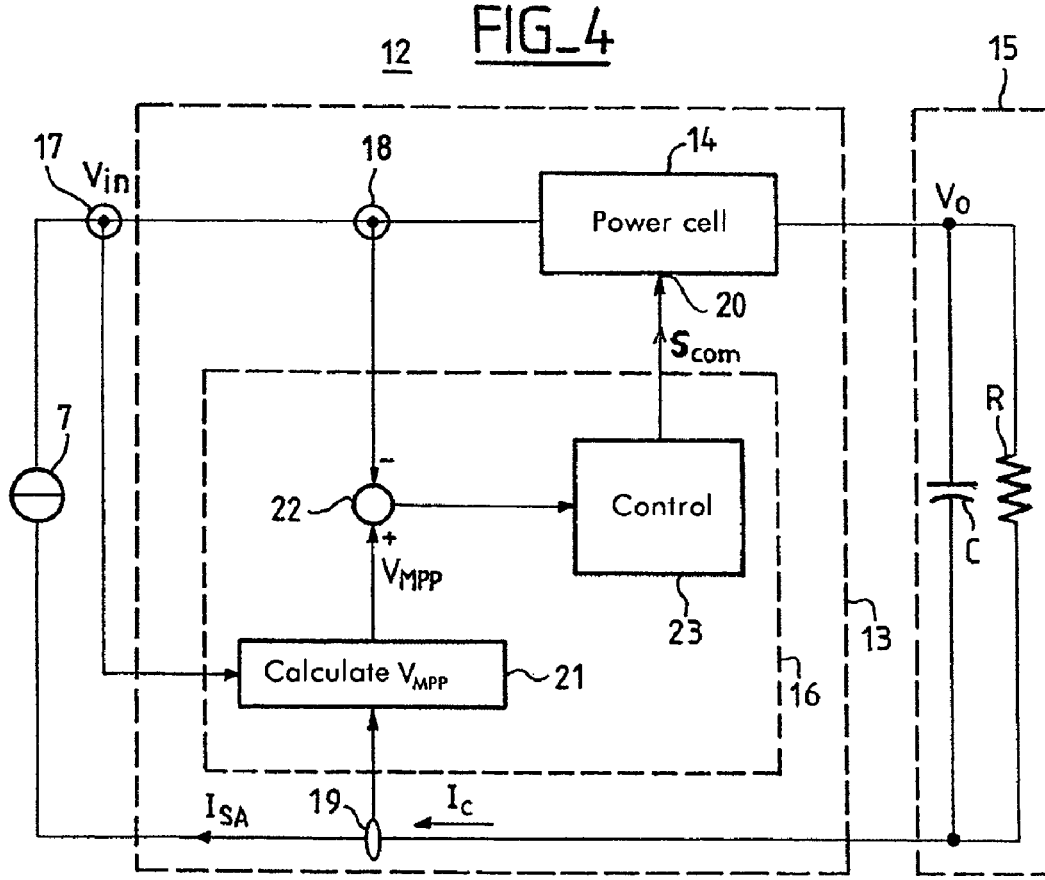
FIG_4

FIG_5

|  | MEASURED VALUES | | | SIMULATED VALUES | |
|---|---|---|---|---|---|
|  | i | v |  |  |  |
| point 1 | 0,04986 | 0,596627 |  | Di1 | -0,0277 |
| point 2 | 0,07756 | 0,59583443 |  | Di2 | -0,0277 |
| point 3 | 0,10526 | 0,59501902 |  | Dv1 | 0,000792574 |
| point 4 | 0,13296 | 0,59417942 |  | Dv2 | 0,000839597 |
|  | iSC(0) | 1,0530 |  | iSC | 1,053101276 |
|  | vC0(0) | 0,5980 |  |  |  |
|  | iMP(0) | 0,9951 |  |  |  |
|  | vMP(0) | 0,5020 |  |  |  |
|  | iR(0) | 7,0294E-10 |  | iR | 7,04036E-10 |
|  | AF0 | 1,09025888 |  | A | 1,090335898 |
|  | kT/q | 0,02596125 |  |  |  |
|  | a0 | 35,330092 |  | a | 35,32764541 |
|  |  |  |  | i | 0,998173458 |
|  |  |  |  | f(i) | -2,0706E-06 |
|  |  |  |  | f'(i) | 294,4310992 |
|  | iMP | 0,98612 |  | iM | 0,998173465 |
|  | vMP | 0,51997873 |  | vM | 0,514361968 |

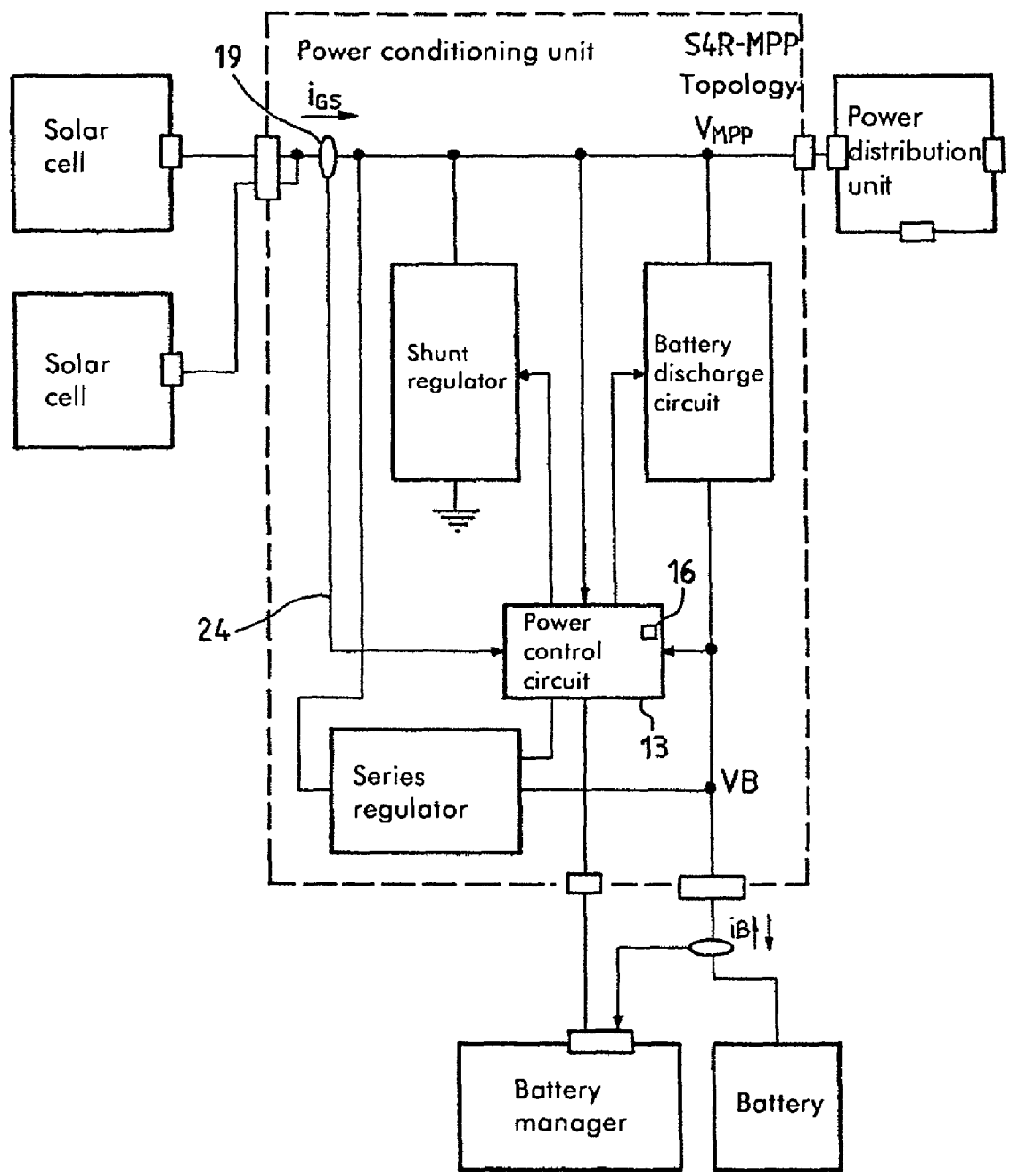

FIG_7
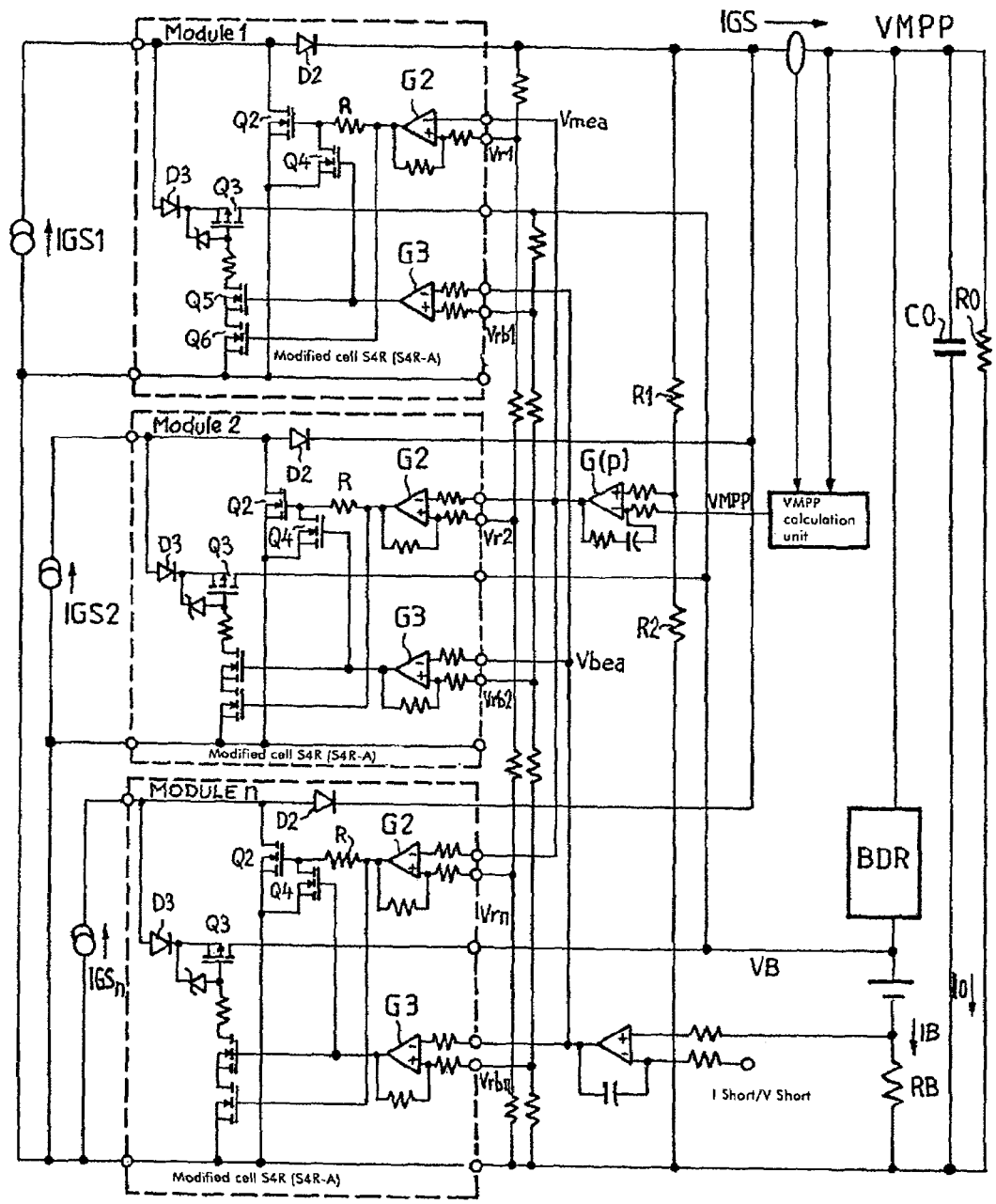

CONDITIONING CIRCUIT FOR A POWER SUPPLY AT THE MAXIMUM POWER POINT, A SOLAR GENERATOR, AND A CONDITIONING METHOD

CROSS-REFERENCE TO RELATED APPLICATIONS

This application is based on French Patent Application No. 02 11 597 filed Sep. 19, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to power supplies and more precisely to the operation of power supplies for which the curve of the power supplied as a function of the voltage at the terminals of the supply features a maximum.

For a power supply of the above kind, the power supplied is at a maximum when the voltage has a given value. For optimum use of the power supply—to draw maximum power therefrom—it is advantageous for the voltage at the terminals of the supply to be as equal to the aforementioned given value as often as possible.

2. Description of the Prior Art

The solar generators used for satellites constitute one example of a power supply of the above kind. FIG. 1 shows a graph of the current and the power as a function of the voltage at the terminals of a generator, in the case of a generator formed by a series connection of a multiplicity of Si BSR (Back Surface Reflector) cells; cells of this kind are available in the aerospace industry. The current in amperes supplied by the solar generator and the power in watts delivered by the solar generator are plotted on the ordinate axis; the voltage in volts at the terminals of the solar generator is plotted on the abscissa axis. Curves 1 and 2 in FIG. 1 correspond to operation at a temperature of +100° C.; curves 3 and 4 correspond to operation at a temperature of −100° C. Curve 2 in FIG. 1 is a graph of current as a function of voltage and shows that the current supplied by the cells falls when the voltage exceeds a value of the order of 35 V, which is explained by a cell saturation phenomenon; the curve 4 is similar, except that the saturation voltage is of the order of 75 V. Curve 1 in FIG. 1 is a graph of the power supplied by the solar generator and shows that the power supplied features a maximum which in this example has a value of the order of 100 W and is achieved for a value $V_0$ of the voltage that is of the order of 38 V. Curve 4 is similar to curve 2, with a maximum power of the order of 200 W and a voltage $V_0$ of the order of 70 V. These curves constitute only one particular example of a generator in which the graph of the power supplied as a function of the output voltage features a maximum.

To use a solar generator of the above kind, or more generally a power supply of the above kind, it is advantageous for the voltage at the terminals of the supply to be as close as possible to the value $V_0$ of the voltage at which the power supply delivers maximum power. This problem is particularly acute in the case of solar generators used in satellites, for which the voltage $V_0$ at which the power supplied by the solar generator is at a maximum varies as a function of the temperature to which the solar generator is subjected, as shown in FIG. 1; the voltage $V_0$ also varies as a function of:

the intensity of the solar radiation to which the generator is exposed, and aging of the generator.

For a satellite in low Earth orbit, the temperature can typically vary in a range from −100° C. to +100° C. The intensity of the solar radiation can vary as a function of the distance from the Sun; for a mission from the Earth to Mars, the intensity of the solar radiation can vary in a ratio of 3 to 1. Aging of the generator causes the short circuiting of some cells. Overall, the voltage $V_0$ can typically vary in a ratio of 1 to 2, for example from 40 to 80V.

Thus one of the major difficulties to be overcome in predicting the optimum operating point lies in the dependence of the power delivered by a solar generator on parameters such as the incident solar energy, which is a function of the position of the cells relative to the light rays, the temperature of cells exposed to sunlight but dissipating energy by reflection and conduction toward the shaded rear surface, and, finally, aging of the cells and deterioration thereof caused by the environment, such as microcracks and meteorite impacts.

Another problem relates to the nature of the parameter to be optimized, i.e. the electrical power, which cannot be sensed directly. The two electrical parameters that can be measured directly are the current and the voltage of a cell or of the solar generator. The power is the result of multiplying the instantaneous values of these parameters. Determining the maximum power amounts to calculating the derivative of the instantaneous power as a function of the current or of the voltage and slaving the derivative to a null value. All maximum power point tracking (MPPT) algorithms that track this derivative employ excitation of the operating point of the solar generator with the aid of a DC/DC converter allowing excursion of this point around its optimum position without being able to fix thereto in a durable manner.

The design of an MPPT converter with efficiency and stability performance enabling long-term use in space has not led to this principle being competitive with concepts based on the distribution of a voltage regulated with the aid of sequential switching shunt regulators (S3R) or sequential switching shunt and series regulators (S4R) for geostationary Earth orbit (GEO) satellites.

The increasingly frequent use of low Earth orbit (LEO) satellites with arrangements, known as constellations, of several dozen satellites with powers of a few kW has returned MPPT concepts to the agenda. The essential reason is that, on such missions, involving frequent eclipses with short sunlit periods, of the order of 60 minutes, the load network employs units operating in high intensity power pulse mode. This type of use represents a severe constraint on the battery, which must be recharged rapidly at high currents over short periods. It is evident that, in this context, the solar generator has an essential role and that it is apparently necessary to bias it to its maximum power point, as otherwise it may have a rating that is higher than is strictly necessary.

The characteristics of the optimum operating point are explained hereinafter.

A solar generator is constituted of an assembly of identical solar cells in an array formed of m rows each containing n cells in series, and the electrical characteristic of a solar generator is an image of the electrical behavior of a cell.

A cell is defined by four electrical parameters, the short circuit current $i_{SC}$, the open circuit voltage $v_{OC}$ and the current-voltage coordinates $i_{MP}$ and $v_{MP}$ of the optimum point known as the maximum power point (MPP). These parameters are specified under standard conditions of illumination and temperature $T_0$ at the start of life. They are therefore liable to evolve as a function of the temperature $T$ of the cell, whence:

$$i_{SC}(T) = i_{SC}(T_0) + (T - T_0)\frac{di_{SA}}{dT} \quad (2.1)$$

$$v_{OC}(T) = v_{OC}(T_0) + (T - T_0)\frac{dv_{OC}}{dT}$$

$$i_{MP}(T) = i_{MP}(T_0) + (T - T_0)\frac{di_{MP}}{dT}$$

$$v_{MP}(T) = v_{MP}(T_0) + (T - T_0)\frac{dv_{MP}}{dT}$$

The cell is also described by its mechanical parameters, namely its length L, width I, and thickness e. The power $P_S$ received by the cell is proportional to its surface area S, i.e.:

$$P_S = \frac{P_0}{LI} \quad (2.2)$$

in which $P_0$ is the power per m² supplied by the Sun, that is to say 1 230 W/m², or the light source. The cell transforms this light power into electrical power $P_{MP}$ with an efficiency η such that:

$$\eta = \frac{v_{MP}(T)i_{MP}(T)}{P_S} = \frac{P_{MP}}{P_S} \quad (2.3)$$

The electrical characteristics of a solar cell correspond to evolutions of the current $i_{SA}$ and the power $P_{SA}$ delivered thereby as a function of the voltage $v_{SA}$ at its terminals. Tada and Carter have studied modeling of the electrical behavior of the cell, which corresponds to the following equations:

$$i_{SA}(t) = i_{SC}(t) - i_R\left(\exp\left(\frac{qv_{SA}(t)}{AkT}\right) - 1\right) \quad (2.4)$$

$$P_{SA}(t) = v_{SA}(t)i_{SA}(t)$$

in which $i_R$ is the saturation current of the semiconductor junction and A is a parameter which defines the influence of diffusion and recombination phenomena and varies from 0.5 to 2.5. The value of the coefficient kT/q at 28° C. is 0.02596125.

FIG. 2 shows the evolutions of $i_{SA}(v_{SA})$ and $P_{SA}(v_{SA})$ at a time t at which the illumination and temperature conditions are defined for a cell characterized by its parameters as measured under standardized conditions.

The $i_{SA}(v_{SA})$ characteristic 5 (FIG. 2) is a continuous function, corresponding to an exponential function, and whose derivative is always negative. On the other hand, the $P_{SA}(v_{SA})$ characteristic 6 (FIG. 2) has a maximum at the voltage $v_{MPP}$ which is the voltage of the maximum power point MPP. The associated current of the cell is $i_{MPP}$. The same approach can be adopted by selecting the characteristics $v_{SA}(i_{SA})$ and $P_{SA}(i_{SA})$, which leads to identifying the coordinates of the optimum point from the following equations:

$$\frac{dP}{dv_{SA}} = \frac{dP}{di_{SA}} = 0 \quad (2.5)$$

or $$\frac{dv_{SA}}{di_{SA}} = 1 \quad (2.6)$$

The properties of the maximum power point are therefore characterized by the fact that the derivatives of the operating points situated to the left of the MPP are positive whereas those of points situated to its right are negative.

This property can be exploited in dynamic operation by observing that any variation $dv_{SA}$ about a point M to the right of the MPP leads to a variation $di_{SA}$ of the same sign. A change of phase is introduced if the point M is to the left of the MPP.

Finally, the absolute value of the tangent to the characteristic $i_{SA}(v_{SA})$ at the MPP is 45° (π/4). For points to its left its value is from 0 to π/4. For points to the right of the MPP, it is from π/4 to π/2.

The basic principles of maximum power point tracking (MPPT) are described next.

The characteristic $I_{SA}(V_{SA})$ of a solar generator with m rows, also known as strings, each constituted of n cells in series, is of the following form, where $R_S$ is the series resistance of the cell:

$$I_{SA} = m\left(i_{SC} - i_R\left(\exp\left(\frac{q}{nAkT}\left(V_{SA} + \frac{n}{m}R_S I_{SA}\right)\right) - 1\right)\right) \quad (2.7)$$

It is often useful to use the inverse function, which results in using the $V_{SA}(I_{SA})$ characteristic, expressed as follows:

$$V_{SA} = \frac{nAkT}{q}\text{Log}\left(1 + \frac{i_{SC} - \frac{I_{SA}}{m}}{i_R}\right) - \frac{n}{m}R_S I_{SA} \quad (2.8)$$

The instantaneous power $P_{SA}(t)$ of the solar generator is the product of the instantaneous voltage $V_{SA}(t)$ and the instantaneous current $I_{SA}(t)$, both measured at time t:

$$P_{SA}(t) = V_{SA}(t)I_{SA}(t) \quad (2.9)$$

Biasing the solar generator to its MPP implies a knowledge of the coordinates of that point. This point can be determined only by exploiting the properties of the MPP. If the concepts based on the use of conventional DC/DC converters whose control is based on computing the tangent to the $I_{SA}(V_{SA})$ characteristic and locking it to the value π/4 are eliminated, the general principle of MPP tracking is based on differentiating equation 2.9, yielding:

$$dP_{SA}(t) = I_{SA}(t)dV_{SA}(t) + V_{SA}(t)\,dI_{SA}(t) \quad (2.10)$$

Determining the optimum operating point amounts to finding the maximum of the function $P_{SA}(t)$, i.e. solving the equation:

$$0 = I_{SA}(t)dV_{SA}(t) + V_{SA}(t)dI_{SA}(t) \quad (2.11)$$

i.e.:

$$\frac{dV_{SA}(t)}{dI_{SA}(t)} = -\frac{V_{SA}(t)}{I_{SA}(t)} \quad (2.12)$$

Interpreting this equation indicates that the MPP corresponds to the intersection of the straight load line and the differential impedance of the generator.

Although determining $I_{SA}$ and $V_{SA}$ is not problematical, the same cannot be said of the differential impedance. One way to measure it consists in using a time differential such that:

$$\frac{dV_{SA}}{dI_{SA}} = \frac{\frac{dV_{SA}}{dt}}{\frac{dI_{SA}}{dt}} \quad (2.13)$$

Computing this impedance amounts to differentiating the values of $I_{SA}$ and $V_{SA}$ already measured to evaluate the straight load line. The technical difficulty lies in managing the division of these magnitudes. As a general rule, solving equation (2.13) requires a dynamic maximum power point tracking (MPPT) algorithm. Prior art MPPT systems differ in the type of algorithm employed. Those most widely used and their associated drawbacks are cited below.

In the control systems currently used, maximum power point tracking is based on permanent tracking of the maximum power point excitation of the solar generator with the objective of tracking with as small a difference as possible:

A first method detects crossing of the MPP. This method is that most widely used. It consists in traveling along the $P_S(V_{SA})$ characteristic and detecting the time at which the MPP is crossed, in order to return to it and bracket it. Two methods can be employed.

Crossing the MPP can be detected by detecting the peak power. This simple principle relies on a sampling process. The power $P_S(t)$ demanded of the generator is progressively perturbed, and then stored at regular time intervals $T_S$. The comparison of the powers $P_S(t_1)$ and $P_S(t_2)$ between two successive samples taken at times $t_1$ and $t_2$ yields:

$$\frac{P_S(t_2) - P_S(t_1)}{t_2 - t_1} = \frac{dP_S}{dt} \quad (2.14)$$

If $dP_S/dt$ is positive, the operating point is to the left of the MPP, the sign of the perturbation is not modified, and the perturbation must evolve toward increasing powers demanded of the solar generator. The detection of a negative $dP_S/dt$ indicates that the MPP has been crossed and that the sign of the perturbation must be reversed. The power $P_S(t)$ is generally stored in memory by a zero order blocker or peak detector. The perturbation is generally obtained by means of a sawtooth operating on a current-controlled DC/DC converter.

Crossing the MPP can also be detected by detecting a change of phase. In this case, the perturbation is a sinusoidal signal of frequency ω applied to a DC/DC converter and which modulates the operating point of the solar generator by introducing therein a sinusoidal variation of low amplitude. The measured current $I_{SA}(t)$ reflects this perturbation with a possible phase-shift φ, with the result that:

$$I_{SA}(t) = I_{SA}(0) + i\sin(\omega t + \phi) \quad (2.15)$$

The measured voltage $V_{SA}(t)$ also reflects the sinusoidal modulation. The position of the operating point relative to the MPP is determined by comparing the phases. The phases are the same to the right of the MPP and opposite to its left.

A second method consists of detecting crossing the MPP by a logical process. The use of this approach will expand in the future, thanks to advances in microprocessors. The method consists in establishing a logical table in which the measured magnitude signs are taken into account to orient the MPPT direction. Observation of the characteristics $I_{SA}(V_{SA})$ and $P_S(V_{SA})$ indicates that, if the operating point is to the left of the MPP, then for any perturbation of duration dt:

$$\text{sign}\frac{dP_S}{dt} = \text{sign}\frac{dV_{SA}}{dt} \quad (2.16)$$

The operating point is to the right of the MPP if, to the contrary:

$$\text{sign}\frac{dP_S}{dt} = -\text{sign}\frac{dV_{SA}}{dt} \quad (2.17)$$

It follows that a signal s(t) for orienting the direction of an excursion can be generated by activating a DC/DC converter according to the sign of:

$$\frac{dP_S}{dt}\frac{dV_{SA}}{dt} = s(t) \quad (2.18)$$

If s(t)>0 the operating point M is such that $V_M < V_{MPP}$, and the DC/DC converter is deactivated to allow the potential of the solar generator to increase. If s(t)<0, the operating point of the solar generator has crossed the MPP and the DC/DC converter can be activated again. This approach does not necessitate sampling.

The above MPPT solving methods have serious drawbacks.

The most serious drawback of these methods is the necessity to insert between the solar generator and the load network units allowing independent evolutions of their potentials. To allow the solar generator to operate at its MPP, it is obligatory to assign it total freedom in terms of the evolution of its operating point. This is all the more important in that this point is excited continuously by an MPPT algorithm. The measurements effected bracket the MPP and vary the voltage of the solar generator around the MPP. Similarly, the voltage of the network is subject to different constraints, imposing either a regulated voltage $V_0$ different from that of the MPP, or a battery voltage $V_B$, which must be able to evolve freely according to whether the battery is charging or discharging. A consequence of the obligatory insertion of regulators between the GS and the network is the mass contribution and the energy take-off of these buffer units. All the maximum power of the solar generator has to pass through these units. The mass penalty is of the order of 3 g/W, which raises to 30 kg the mass of a unit of this kind for a satellite requiring 10 kW of power. From the efficiency point of view, these units continuously sample from approximately 7% to 10% of the power in transit. This has two consequences: firstly, an increase of approximately 10% in the performance of the GS in terms of mass, volume and power, and evacuation of the power dissipated by the regulators, which is of the order of 1 kW for an 11 kW GS, which leads to the use of heat pipes with the associated mass and energy constraints.

The major drawback of continuous tracking processes is the very necessity for continuous tracking, as their name indicates. Detection of the MPP necessarily entails a dynamic process that causes displacement of the operating point of the solar generator to measure the displacement and orient it toward the MPP. The MPP is detected only when it is crossed. The DC/DC converter cannot be slaved to the MPP, constantly oscillating about this point, which becomes an ideal equilibrium position that is never attained.

Furthermore, whatever tracking algorithm is used, detection of the MPP implies instantaneous measurements of $I_{SA}(t)$ and $V_{SA}(t)$ and, most importantly, the generation of the product $I_{SA}(t)V_{SA}(t)$ to show up $P_S(t)$ or of ratios such as $V_{SA}(t)/I_{SA}(t)$ or $dV_{SA}(t)/dI_{SA}(t)$ to determine differential and load impedances.

These non-linear functions must be implemented in the analog domain as they are operative in the DC/DC converter regulation loop. The integrated circuits that carry out these operations have an accuracy that varies with their operating range and demand signals of matched amplitude.

Biasing a solar generator around its MPP requires a system whose functional organization is as shown in FIG. 3. It is characterized by a solar generator 7 whose instantaneous parameters $V_{SA}(t)$ and $I_{SA}(t)$ are picked up and transmitted to an MPPT management unit 8. The solar generator is connected to a Buck power cell which is responsible for transferring the power $P_S(t)$ to a load network RC at a regulated voltage $V_0$. The role of the power cell is to isolate the generator from the network and to enable it to evolve optimally with excellent energy efficiency. The network voltage is slaved to the value $V_0$ by a main error amplifier (MEA) control loop, which compares the voltage $V_0$ to a reference voltage $V_{REF}$. The switch Q of the power cell is controlled in pulse width modulation (PWM) mode by a driver module 10 in turn controlled by a priority management unit 11 which interfaces the MPPT and MEA control loops.

This priority management function biases the solar generator (GS) about the MPP if the power demand of the network requires it, by slaving the voltage $V_{SA}$ to the value $V_{MPP}+/-dV$, i.e. by obligatory slaving of the power cell input voltage. The output voltage is no longer slaved to $V_0$ and can therefore depart from that value. Control priority is assigned to the MPPT loop.

As soon as the power demand of the network decreases and no longer requires biasing of the GS to the MPPT, the MPPT loop is deactivated and the MEA loop returns to service. The output voltage of the power cell is again regulated.

The MPPT function is therefore a control loop integrated into the functioning of a power cell and takes priority over the conventional MEA control function of that unit. A priority selector function is therefore necessary to define the priority loop. The problem with this prior art is therefore that of control interference.

An objective of the present invention is therefore to remedy the drawbacks cited hereinabove.

SUMMARY OF THE INVENTION

One particular object of the invention is to propose a circuit for conditioning a power supply for biasing the latter to its MPP by way of a control function including a single regulation loop, without using continuous tracking algorithms, which can only bracket the MPP.

To this end, the invention consists in a circuit for conditioning a power supply for which a graph of the power supplied as a function of the voltage at the terminals of said power supply features a maximum, said conditioning circuit comprising:
  a power cell with one input adapted to be supplied with power by said power supply and one output adapted to supply power to a load, and
  a circuit for controlling said power cell by means of a control signal applied to said power cell to slave the input voltage of said cell,
in which conditioning circuit, the current-voltage characteristic of said power source being an exponential function, said control circuit includes:
  calculation means comprising means for receiving instantaneous measurements of points on said characteristic and a program adapted to determine the equation of said characteristic using a predetermined first method on the basis of four points on the characteristic and to determine said maximum to serve as an operation reference by a second method, and
  control means for supplying said control signal representative of the difference between the required reference voltage calculated by said calculation module and the instantaneous voltage at the output of the power supply so as to cancel out said control signal.

Thus the invention is cleverly and inventively based on the following theorem: "An exponential function is entirely defined by a knowledge of four points on it".

Thanks to the invention, the computation means capture the measured instantaneous current-voltage coordinates of four points on the characteristic $I_{SA}(V_{SA}(t))$ of the power supply and precisely generate the reference voltage $V_{MPP}$ to which the output voltage of the power supply is locked by a single control loop.

It must be noted that the invention is used to bias a power supply, such as a solar generator, to its MPP by a conventional control loop that is in no way based on any kind of tracking algorithm, whether analog, numeric, digital, logical, etc., which usually causes the power unit (regulator, converter) to oscillate about that point without being able to become fixed thereon.

On the other hand, according to the invention, the fact of obtaining the coordinates of the MPP by an independent calculation of the functioning of the control loop and operating on the latter by means of a reference signal means that this principle can be used for all existing or future types of converters and regulators.

In one embodiment, said current-voltage characteristic of said power supply being of the form:

$i = i_{SC} - i_R(\exp(av) - 1)$ said first method is adapted to determine the parameters of the above equation from the following equations:

$$a = \frac{1}{v_1 - v_2} \mathrm{Log}\left(\frac{di_1}{di_2} \frac{dv_2}{dv_1}\right)$$

$$i_R = -\frac{di}{dv} \frac{1}{a\exp(av)}$$

$$i_{SC} = i - i_R(\exp(av) - 1).$$

In one embodiment said second method adapted to determine said maximum uses the Newton-Raphson method applied to the equation of said characteristic.

One embodiment of the circuit includes a current sensor adapted to supply the instantaneous current in a regular manner and wherein said calculation module is adapted to launch said program as soon as the current variation between the instantaneous current and the maximum power point current exceeds the predetermined threshold.

In one embodiment the control circuit includes an adder for comparing the instantaneous voltage at the output of said power supply and the voltage generated by said calculation means, said adder delivering at its output a signal representative of the difference between the latter magnitudes at the input of said control means.

The invention also provides a solar generator comprising a power supply for which a graph of the power supplied as a function of the voltage at the terminals of said power supply features a maximum, which solar generator is adapted to be conditioned by the circuit according to the invention.

The invention further provides a method of using a conditioning circuit to condition a power supply for which a graph of the power supplied as a function of the voltage at the terminals of said power supply features a maximum, said conditioning circuit comprising:

a power cell with one input adapted to be supplied with power by said power supply and one output adapted to supply power to a load, and a circuit for controlling said power cell by means of a control signal applied to said power cell to slave the input voltage of said cell, which conditioning method includes, the current-voltage characteristic of said power source being an exponential function:

a step of determining the equation of said current-voltage characteristic using a predetermined first method and four points on said characteristic, a step of using a second method to determine said maximum to serve as an operation reference, and a step of transmitting said control signal representative of the difference between the calculated reference and the instantaneous voltage at the output of said power supply in such a manner as to cancel out said control signal.

In one embodiment, the current-voltage characteristic of said power supply being of the form:

$i = i_{SC} - i_R(\exp(av) - 1)$, said first method is adapted to determine the parameters of the above equation from the following equations:

$$a = \frac{1}{v_1 - v_2} \text{Log}\left(\frac{di_1}{di_2} \frac{dv_2}{dv_1}\right)$$

$$i_R = -\frac{di}{dv} \frac{1}{a\exp(av)}$$

$$i_{SC} = i - i_R(\exp(av) - 1).$$

In one embodiment, the second method adapted to determine said maximum uses the Newton-Raphson method applied to the equation of said characteristic.

In one embodiment, the conditioning circuit including a current sensor adapted to supply the instantaneous current in a regular manner, said method launches said program as soon as the current variation between said instantaneous current and said current corresponding to said maximum exceeds a predetermined threshold.

In one embodiment, the program uses four points on said characteristic, one of which is said maximum, and the other three being obtained by application of successive voltage levels at the output of said calculation means and by sensing corresponding currents.

Other features and advantages of the invention will become apparent on reading the following description with reference to the drawings of one embodiment of the invention provided by way of example only.

BRIEF DESCRIPTION OF THE DRAWINGS

FIG. 1 is a graph of current and power as a function of the voltage at the terminals of a power supply.

FIG. 2 shows the evolution of $i_{SA}(v_{SA})$ and $P_{SA}(v_{SA})$ at a time t at which the illumination and temperature conditions are defined for a cell characterized by its parameters as measured under standardized conditions.

FIG. 3 is a functional representation of a prior art solar generator biasing system.

FIG. 4 is a diagrammatic representation of a system conforming to one embodiment of the invention incorporating a power supply and an associated power conditioning circuit.

FIG. 5 is a table illustrating experimental verification of the principle of the invention.

FIG. 6 is a diagrammatic representation of a power conditioning circuit according to the invention suited to an S4R power system.

FIG. 7 shows the power conditioning circuit of the FIG. 6 topology in a version with n S4R modules.

DETAILED DESCRIPTION OF THE PREFERRED EMBODIMENT

In the present application, items having identical or similar functions carry the same reference numbers.

FIG. 4 is a diagrammatic representation of a system 12 incorporating a power supply, in this instance a solar generator 7, and a power conditioning circuit 13 conforming to one embodiment of the invention, in an application for supplying power to an RC load. The application could of course be oriented toward supplying power to a voltage bus of a satellite. The conditioning circuit enables the conditioned generator to deliver power at a fixed voltage $V_0$, in other words to behave as a voltage source. The conditioning circuit also maximizes the power supplied by the solar generator.

FIG. 4 shows that the voltage $V_{in}$ at the terminals of the solar generator is applied to the input of a power cell 14 (which can be a DC/DC converter) and is slaved to the MPP voltage.

The voltage $V_0$ at the output of the power cell 14 is applied to an RC load 15; this usually includes a battery supplying power to the load, but this has no influence on the operation of the circuit.

The power cell 14 is controlled by a control circuit 16. As described in detail hereinafter, the control circuit 16 includes a controller which groups together all of the control functions of the power cell and a calculation module generating the MPP voltage that serves as the control reference point. The control circuit 16 receives at its input the input voltage $V_{in}$ applied to the cell 14 and the operating current $I_{SA}$ of the generator 7; the figure shows diagrammatically voltage sensors 17 and 18 and a current sensor 19. The control circuit 16 supplies a control signal $S_{com}$ that is applied to a control input 20 of the cell 14, as shown in the figure.

As explained above, the power supplied by the solar generator 7 is a function of the voltage $V_{in}$ at the terminals of the generator; the voltage at which the maximum power is supplied can vary in a range [V0min, V0max], in this example a range from 40 to 80 V. A routine solution is for the voltage bus of the satellite to operate at a nominal voltage of 28 V, the voltage varying between 23 V and 37 V as a function of the load supplied by the voltage bus. In practice, the nominal voltage of the bus is lower than the lower limit $V_{0min}$ of the range in which the voltage varies for which the power supplied is maximum. In the above kind of configuration, the power cell can be a PWM (pulse width modulation) converter 14, for example a Buck converter. This type of converter is particularly suited to operation with an output voltage lower than the input voltage. In this case the input signal is representative of the pulse width modulation duty cycle.

Regardless of its topology, the power cell is inserted between the solar generator and the load network to isolate them and to allow their potentials to evolve freely. Regardless of its type (PWM, hysteresis, etc), the power cell is controlled by the control circuit 16, which obliges it to regulate its input voltage according to a reference point that is none other than the MPP voltage, as explained hereinafter.

The objective is to provide a reference voltage that is the voltage at the MPP. The reference voltage must be a stable DC voltage that is at all times representative of how the MPP changes with the environment and with temperature. This reference voltage is delivered by the control circuit module 21 for calculating $V_{MPP}$, which is situated outside the control loop.

The $V_{MPP}$ calculation module executes one of the main functions of the control circuit, which is described next.

This main function is based on modeling the solar cell, and thus the solar generator, and the following theorem: "an exponential function is entirely defined by a knowledge of four points on it".

The $V_{MPP}$ calculation function is implemented by the module 21, for example a microprocessor, which, for each renewal of the voltage $V_{MPP}$, measures the instantaneous current-voltage coordinates of four points on the characteristic $I_{SA}(V_{SA}(t))$ of the solar generator and, by means of an astute calculation explained hereinafter, generates the reference voltage $V_{MPP}$.

The modeling of the voltage $V_{MPP}$ is demonstrated in the context of a solar cell. The characteristic i(v) of a cell at a time t is of the following form, neglecting the effect of the series resistance $R_s$:

$$i = i_{SC} - i_R(\exp(av) - 1) \tag{4.1}$$

Substituting, for simplicity:

$$a = \frac{q}{AkT} \tag{4.2}$$

it follows that:

$$\frac{di}{dv} = -i_R a \exp(av) \tag{4.3}$$

Having measured the positions of four points $M_1$, $M_2$, $M_3$, $M_4$ on the characteristic of the solar cell, it is possible to evaluate the instantaneous values $a$, $i_R$ and $i_{SC}$, as follows:

$$\frac{\frac{dt_1}{dv_1}}{\frac{di_2}{dv_2}} = \frac{\exp(av_1)}{\exp(av_2)} = \exp(a(v_1 - v_2)) \tag{4.4}$$

Whence:

$$a = \frac{1}{v_1 - v_2} \mathrm{Log}\left(\frac{di_1}{di_2} \frac{dv_2}{dv_1}\right) \tag{4.5}$$

$$i_R = -\frac{di}{dv} \frac{1}{a \exp(av)}$$

$$i_{SC} = i - i_R(\exp(av) - 1)$$

Note that $i_R$ can be evaluated using any of the four points. An average value can improve the accuracy with which this parameter is calculated. Evaluating these two parameters enables modeling of the electrical characteristics of the power cell. In particular, it provides access to the determination of the MPP, which is related to the computation of the derivative of the power P, as follows:

$$\frac{dP}{di} = \frac{AkT}{q}\left(\mathrm{Log}\left(\frac{i_{SC} - i}{i_R}\right) - \frac{i}{i_R}\frac{1}{1 + \frac{i_{SC} - i}{i_R}}\right) \tag{4.6}$$

The condition dP/dv=0 for the maximum makes it possible to write the equation that provides access to $i_{MPP}$, as follows:

$$\mathrm{Log}\frac{i_{SC} - i_{MPP}}{i_R} = \frac{i_{MPP}}{i_R}\frac{1}{1 + \frac{i_{SC} - i_{MPP}}{i_R}} \tag{4.7}$$

The above equation is quickly solved using the Newton-Raphson method, by carrying out a small number j of iterations starting from a value i(j) close to the value $i_{MPP}$ computed during the preceding cycle. By setting:

$$i_{MPP} = i^{(j+1)} = i^{(j)} - \frac{f(i^{(j)})}{\frac{df^{(j)}}{di}} \tag{4.8}$$

$$f(i) = \mathrm{Log}\frac{i_{SC} - i}{i_R} - \frac{i_{MPP}}{i_R}\frac{1}{1 + \frac{i_{SC} - i}{i_R}} \tag{4.9}$$

$$\frac{df}{di} = -\frac{2}{i_{SC} - i} + \frac{i}{(i_{SC} - i)^2} \tag{4.10}$$

the value of the reference voltage can be calculated immediately, as follows:

$$v_{MPP} = \frac{1}{a}\mathrm{Log}\left(1 + \frac{i_{SC} - i_{MPP}}{i_R}\right) \tag{4.11}$$

Thus, thanks to the invention, the maximum power point determined from the voltage $V_{MPP}$ is astutely obtained by measuring four points on the current-voltage characteristic of the generator.

The functions of the calculation module are to effect the measurements at four points on the electrical characteristic i(v) of a solar generator and to effect off-line the calculation of the intermediate parameters a, $i_R$ and $i_{SC}$, iteration of the Newton-Raphson method to calculate $v_{MPP}$, and then generation of the reference voltage $v_{MPP}$ for slaving the chosen power unit.

A high quality of slaving to the MPP implies continuous tracking of the evolution in the performance of the solar generator. This measuring and calculation procedure must be renewed each time that the MPP evolves.

This MPP tracking does not require the support of a tracking algorithm based on a sampled system in continuous oscillatory operation at a fixed or variable frequency. Knowing the coordinates of the MPP ($i_{MPP}$ and $v_{MPP}$), in order to control the regulation of the voltage $v_{MPP}$ of the solar generator, any variation $\Delta i_{MPP}$ greater than a predetermined value is highlighted continuously since the current i(t) is measured continuously ($I_{SA}$). As soon as the threshold is reached, the signal triggering the procedure is generated. As long as the threshold has not been reached, the control reference point remains constant and likewise the voltage of the solar generator.

The signal for triggering the procedure implies a knowledge of the current $i_1$ at the point $M_1$, which is the old MPP. This point is therefore immediately available. The three other points can be obtained by applying successively a step $\Delta V_{MPP}$, then 2 and 3 to the reference voltage $V_{MPP}$, and sensing the corresponding currents $i_2$, $i_3$, $i_4$.

FIG. 4 shows one embodiment of the control circuit 16. The calculation module 21 captures the voltage $V_{in}$ by means of the voltage sensor 17 and the instantaneous current $I_{SA}$ by means of the current sensor 19. According to whether the threshold mentioned above is reached or not, the procedure for calculating the new reference $V_{MPP}$ is started or not. For as long as the threshold has not been reached, the control reference remains constant, and likewise the voltage of the solar generator. As soon as the threshold is reached, the procedure is started. The method of calculating the new reference voltage $V_{MPP}$ is triggered in the manner described above. An adder 22 supplies at its output a signal representative of the difference between the new reference voltage $V_{MPP}$ supplied by the calculation module and the instantaneous voltage $V_{IN}$ at the output of the generator and supplied by the voltage sensor 18. The signal supplied by the adder is applied to an input of the controller 23 whose function is to cancel the setpoint $S_{com}$. The output signal of the controller forms the output signal of the control circuit 16.

It must be underlined that an immediate and advantageous advantage of applying this principle is that it applies to all power cell topologies, whether they are series or shunt, PWM, quasi-resonant, S3R or S4R, and however they are controlled (PWM, hysteresis, voltage or current modes). The only condition is to regulate the voltage of the solar generator on the basis of a predetermined reference voltage. The determination of the reference voltage $V_{MPP}$ is not part of the functional organization of the power cell. It is independent of the control loop. It is interpreted by the latter as a control signal. It is generated by an autonomous function executed by the $V_{MPP}$ calculation module, which is or is not substituted for the reference voltage of the regulator without degrading the concept.

The calculation module $V_{MPP}$ is therefore a function external to the power cell (converter or regulator). It does not modify its operation. It can be applied thereto at any moment chosen by the designer. It is a standardizable function which can be implemented by means of an ASIC or any other technological choice.

The principle of biasing a solar generator to its MPP has become possible by virtue of technological advances enabling an autonomous microprocessor to be incorporated for performing slow and relatively unrepetitive operations in a power system.

It will also be noted that this principle is liable to modify the behavior of power system designers since it associates all current power system concepts (S3R, S4R regulated buses, hybrid or unregulated bus) with the principle of operating a solar generator at its MPP.

All these power system concepts are based on the use of shunt regulators connected to solar generator sections with the aim of radiating into space surplus energy over and above what is required by the load by short circuiting some sections. The generator voltage is therefore imposed by various control devices (battery discharge regulator (BDR) and battery charge regulator (BCR)) situated in the power conditioning unit (PCU), either at a regulated voltage $V_0$ imposed at the design stage in regulated bus designs or at the battery voltage $V_B$ in unregulated bus designs. The generator voltage therefore cannot evolve toward its MPP. It is to prevent this coupling that current MPPT principles insert series regulators between the solar generator and the bus or the battery.

By replacing the reference voltage in the PCU by the reference voltage $V_{MPP}$, the proposed principle replaces the regulated voltage $V_0$ with the regulated voltage $V_{MPP}$. The principle of operation of the modified PCU remains exactly the same, but now allows the maximum power of the generator to be exploited.

The most interesting situation is that relating to the S4R power system. The PCU of this kind of system is shown in FIG. 6. It differs from the S4R topology by the fact that, in the power conditioning system according to the invention, the reference to the MEA has been replaced by the calculated value $V_{MPP}$ and the GS current is measured continuously by means of the connection 24 and the sensor 19.

From a practical point of view, the benefit of the principle is more explicit on considering the function of the S4R sections. The power conditioning circuit of the above kind of topology is shown in detail in FIG. 7, in a version with n S4R modules. Note that the voltage of the network is the voltage at the MPP, reconstituted from four voltage and current measurements by the calculation module $V_{MPP}$. The reference voltage $V_{MPP}$ is applied to a comparator G(p) which, after comparison with the network voltage, distributes a control signal $V_{MEA}$ to all of the S4R and BDR modules. If not all the power supplied by the GS is needed, a number of shunt sections $Q_2$ are activated. The battery is charged by taking the unused power and activating series switches $Q_3$ whose number is determined by a control circuit whose control signal $V_{BEA}$ is generated by a comparator $Q_B(p)$ for measuring the battery current and comparing it to a reference.

The above topology is particularly suitable for future high-power satellites (with powers in the range from 10 to 100 kW), because it uses the maximum power of the solar generator and eliminates battery chargers, which are bulky and heavy and dissipate energy. The financial cost can be evaluated as the suppression of those units and the reduction of the solar generator.

The invention was verified experimentally using a spreadsheet and selecting a high-efficiency silicon solar cell whose electrical parameters are set out in the lefthand portion of the FIG. 5 table.

Four points were selected to establish the electrical characteristic of the cell by simulation, using the Tada and Carter model. Four spaced points were chosen to verify the validity of the model. Their coordinates i(t) and v(t) are shown in the lefthand portion of the table.

The plot of the characteristic yields an MPP whose coordinates are given in the bottom lefthand portion of the table. The current at the MPP is 0.986 A at a voltage of 0.519 V.

On the basis of the four points $M_1$, $M_2$, $M_3$, $M_4$ chosen, the differences $Di_1$, $Di_2$, $Di_3$, $Di_4$ and $Dv_1$, $Dv_2$, $Dv_3$, $Dv_4$ necessary for calculating the parameters $a$, $i_R$ and $i_{SC}$ are evaluated. The theoretical values of these parameters are given in the righthand portion of the table, against the measured values. The calculation of $i_{MPP}$ by the Newton-Raphson method is also indicated, prior to the calculation of the coordinates of the MPP. The simulation yields a value of $i_{MPP}$ equal to 0.998 A and a value of $V_{MPP}$ equal to 0.514 V, which represents an accuracy of a few percent in the worst case scenario.

Similarly, the experimental characteristics v(i) and P(v), not shown, reconstructed from four points measured in accordance with the principle of the invention, show a highly reliable match, especially around the MPP, where the error is less than 1%.

Of course, the invention is not limited to the embodiments described in the present application.

Thus the location of the calculation means for generating the coordinates of the MPP is not particularly important. These means can be incorporated into the power unit, on the same basis as the Zener diode that fixes the voltage to be slaved in a regulator.

What is claimed is:

1. A circuit for conditioning a power supply having a current-voltage characteristic that is an exponential function for which a graph of the power supplied as a function of the voltage at the terminals of said power supply features a maximum power point, said conditioning circuit comprising:
    a power cell with one input that is supplied with power by said power supply and one output that supplies power to a load, and
    a control circuit for controlling said power cell via a control signal applied to said power cell to slave the input voltage of said power cell, wherein
    said control circuit comprises:
        calculation means comprising means for receiving instantaneous measurements of points on said current-voltage characteristic and a program that determines said exponential function of said current-voltage characteristic on the basis of four points on said current-voltage characteristic and determines a reference voltage, and
        control means for supplying said control signal representative of the difference between the reference voltage calculated by said calculation means and an instantaneous voltage at the output of the power supply so as to cancel out said control signal.

2. The circuit claimed in claim 1 wherein, said current-voltage characteristic of said power supply being of the form:

$$i = i_{SC} - i_R(\exp(av) - 1),$$

said calculation means determines the parameters of the above equation from the following equations:

$$a = \frac{1}{v_1 - v_2} \text{Log}\left(\frac{di_1}{di_2} \frac{dv_2}{dv_1}\right)$$

$$i_R = -\frac{di}{dv} \frac{1}{a \exp(av)}$$

$$i_{SC} = i - i_R(\exp(av) - 1).$$

3. The circuit claimed in claim 1 wherein said calculation means determines said reference voltage using the Newton-Raphson method applied to said exponential function of siad current-voltage characteristic.

4. The circuit claimed in claim 1, further comprising a current sensor that measures an instantaneous current in a regular manner and wherein said calculation means launches said program when a current variation between the instantaneous current and a maximum power point current exceeds a predetermined threshold.

5. The circuit claimed in claim 1, wherein said control circuit comprises an adder for comparing the instantaneous voltage at the output of said power supply and the reference voltage generated by said calculation means, said adder delivering at its output a signal representative of the difference between the latter magnitudes at the input of said control means.

6. A solar generator comprising a power supply for which a graph of the power supplied as a function of the voltage at the terminals of said power supply features a maximum power point, wherein said solar generator is adapted to be conditioned by the circuit claimed in claim 1.

7. A method of using a conditioning circuit to condition a power supply having a current-voltage characteristic that is an exponential function for which a graph of the power supplied as a function of the voltage at the terminals of said power supply features a maximum power point, said conditioning circuit comprising:
    a power cell with one input that is supplied with power by said power supply and one output that supplies power to a load, and
    a control circuit for controlling said power cell via a control signal applied to said power cell to slave the input voltage of said power cell, wherein said conditioning method comprises:
    a step of determining said exponential function of said current-voltage characteristic using four points on said current-voltage characteristic,
    a step of determining a reference voltage, and
    a step of transmitting said control signal representative of the difference between the calculated reference voltage and an instantaneous voltage at the output of said power supply so as to cancel out said control signal.

8. The method claimed in claim 7 wherein, said current-voltage characteristic of said power supply being of the form:

$$i = i_{SC} - i_R(\exp(av) - 1),$$

wherein the parameters of the above equation are determined from the following equations:

$$a = \frac{1}{v_1 - v_2} \text{Log}\left(\frac{di_1}{di_2} \frac{dv_2}{dv_1}\right)$$

-continued $$i_R = -\frac{di}{dv}\frac{1}{a\exp(av)}$$

$$i_{SC} = i - i_R(\exp(av)-1).$$

9. The method claimed in claim 7 wherein said determination of said reference voltage uses the Newton-Raphson method applied to said exponential function of said current-voltage characteristic.

10. The method claimed in claim 7 wherein said conditioning circuit further comprises a current sensor that measures an instantaneous current in a regular manner, wherein said method determines said exponential function and said reference voltage as soon as a current variation between said instantaneous current and said current corresponding to said maximum power point exceeds a predetermined threshold.

11. The method claimed in claim 7, wherein said method uses four points on said current-voltage characteristic, one of which is said maximum power point, and the other three points being obtained by application of successive voltage levels at the output of said power cell and by sensing corresponding currents.

* * * * *